United States Patent [19]

Aboaf et al.

[11] 4,438,066
[45] Mar. 20, 1984

[54] ZERO TO LOW MAGNETOSTRICTION, HIGH COERCIVITY, POLYCRYSTALLINE, CO-PT MAGNETIC RECORDING MEDIA

[75] Inventors: Joseph A. Aboaf, Peekskill, N.Y.; Erik Klokholm, Stamford, Conn.; Sigrid R. Herd, Pawling, N.Y.

[73] Assignee: International Business Machines Corporation, Armonk, N.Y.

[21] Appl. No.: 280,144

[22] Filed: Jun. 30, 1981

[51] Int. Cl.³ .................................................. C22C 19/07
[52] U.S. Cl. ............................... 420/435; 148/31.57; 428/606; 428/928; 360/134; 360/135; 360/136
[58] Field of Search .............................. 148/31.57, 425; 420/435; 428/606, 611, 928; 360/122, 134, 135, 136

[56] References Cited

U.S. PATENT DOCUMENTS

| 3,755,796 | 8/1973 | Griest | 148/31.57 |
| 3,976,436 | 8/1976 | Chang | 420/435 |
| 4,103,315 | 7/1978 | Hempstead et al. | 428/928 |

OTHER PUBLICATIONS

Hansen, *Constitution of Binary Alloys*, 1958, pp. 492–493.

Primary Examiner—John P. Sheehan
Attorney, Agent, or Firm—Graham S. Jones, II

[57] ABSTRACT

An alloy of $Co_xPt_y$ with y between 10 and 30 at. % is made by sputtering with $H_c > 500$ Oe and $4\pi M_s > 5000$ gauss, and zero magnetostriction. For 10 to 30 at. % Co the sputtered alloy has an $H_c$ of 500–1000 Oe with $4\pi M_s$ of 4000–14000 gauss, a magnetostriction passing through zero between 20 and 30 at. % of Pt. For thickness below 1000Å $H_c$ is large (for the above range of alloys) and magnetization is also larger and coercivity varies as a direct function of Pt composition in the alloy up to 30 at. %.

12 Claims, 5 Drawing Figures

ZERO TO LOW MAGNETOSTRICTION, HIGH COERCIVITY, POLYCRYSTALLINE, CO-PT MAGNETIC RECORDING MEDIA

DESCRIPTION

TECHNICAL FIELD

This invention relates to magnetic recording media coatings and more particularly to a thin film magnetic recording layer on which data is stored in the form of discrete areas of magnetization encoded by magnetic polarity, the magnetization of which can be controlled and sensed by magnetic recording transducers such as magnetic recording heads. The magnetic recording media can be carried on a substrate material such as a tape, disk, drum and other substrates which can support a thin film of a magnetic recording material.

BACKGROUND ART

In storage of information in magnetic recording media, reliability of storage of data is of paramount importance. The trend in modern data processing is towards ever smaller units of the data processing system. In the case of magnetic recording media, this means that the magnetic information is stored in a smaller area of the medium than before. The problem that arises is that it becomes more critical that the medium and the magnetic recording head reading the medium be capable of being used accurately. The head must be moved to exactly the correct position where the information is supposed to be stored on the medium. If the medium remains mechanically stable then the servo control system and the drive which move the magnetic recording head into position to read the magnetic recording medium can position itself based upon the known location of the data on the substrate. However, currently utilized magnetic recording media are magnetostrictive which means that as information is stored in the medium, the magnetostrictive forces generated can alter the stored information. Accordingly, we have found that it is highly desirable for the magnetic recording medium to be composed of materials which have as little magnetostriction as possible. Preferably, the magnetic recording medium should have zero magnetostriction.

U.S. Pat. No. 3,755,796 of Griest for "Cobalt-Platinum Group Alloys whose Anistropy is Greater than their Demagnetizable Field for use as Cylindrical Memory Elements", describes epitaxially sputtering a cobalt containing target in an inert gas to produce single crystal hexagonal cobalt (Co) films to produce a cylindrical domain structure. It is suggested in that connection that the target include precious metals such as ruthenium, rhenium, etc. In Table I, it is started that from 5-12 at. % of platinum can be added to Co to depress the demagnetizing field of Co while retaining a high anisotropy field by stabilizing the hexagonal phase structure of Co to higher temperatures. In claim 6 it is stated that 5-25 at. % of Pt can be added to Co. Ruthenium and rhenium and rhodium could be included respectively up to 35, 25 and 20 at. % in the alloy. Indium and osmium could be added up to 40 atomic percent. The patent is directed to a material for a cylindrical domain memory. The magnetic parameters of the material are not cited. No suggestion of a low magnetostriction, or high coercivity film are made. A polycrystalline film is not suggested nor is a face centered cubic structure.

U.S. Pat. No. 4,202,932 of Chen et al for "Magnetic Recording Medium", describes a magnetic recording medium composed of an alloy of cobalt with rhenium, ruthenium or osmium. The material has a coercivity of up to 800 Oe. The saturation induction can reach 5000 gauss. The film can be made by sputtering, among other thin film deposition techniques. The preferred atomic percentages of the Re, Ru or Os in the admixture is from 5 to 15 at. % at col. 4, line 64 it is stated that the platinum (group VIII) metal is from 2-25 at. %. No mention of magnetostriction is made.

Shirathata, U.S. Pat. No. 3,929,604 for "Method for Producing Magnetic Recording Medium", describes producing such films of Co-Pt among a large number of magnetic alloys by means of ionic plating. Coercivities of the alloys described in detail (other than Co-Pt) are under 400 Oe.

U.S. Pat. No. 3,625,849 of Rogalla, describes "Manufacture of Magnetic Medium" with high coercivity and low magnetostriction manufactured by sputtering followed by heating and annealing at above 600° C. Cobalt is 25-50% of the Co-Cu alloy by weight. Other group VIII metals suggested are Fe and Ni. The other Group IB metal suggested is Au. Alloys suggested are Co-Au, Fe-Au, Fe-Cu and Ni-Au. No suggestion is made of use of Co-Pt alloys.

In U.S. patent application Ser. No. 956,296 of Michaelsen et al "Corrosion Resistant Magnetic Recording Media" teaches the use of Fe-Co-Cr compositions for magnetic recording media. However, we have found that the amount of Fe in the composition taught by Michaelsen et al produces a substantial value of magnetostriction since the amount of Fe varies on the phase diagram in FIG. 2 from 45 at. % up to 100 atomic percent and more importantly, the maximum amount of Co is 55 atomic percent which ranges down to 0% of Co. In accordance with this invention on the other hand, the minimum quantity of Co is 64 at. % and the amount of Co ranges up to 78 at. %. In either case, the amount of chromium (Cr) in the material is about the same. The Cr is present to provide corrosion resistance. It should be emphasized at this point that the objective of the Michaelsen et al patent was to provide a new magnetic recording media which is corrosion resistant. No mention is made there of the problem caused by magnetostriction, because Michaelsen et al were emphasizing the earlier critical problem of corrosion of magnetic recording media which is even more serious than the problem of magnetostriction. At one point in FIG. 3A Ref. 1.3 lists a composition of Fe 19 atomic percent, Co 67 atomic percent and Cr 14 atomic percent among many other materials "deposited by sputtering process". Nothing in the reference suggests that there is a possible advantage to the use of such a composition. It is merely mentioned in a large amount of data which is related to materials which are not useful.

In summary, Michaelsen et al Ser. No. 956,296 describes use of a magnetic medium of 0-55 atomic percent Co, 8-22 atomic percent Cr, with the remainder Fe (23-77 at. %).

The percentage of Cr in the alloy is about the same but the percentages of Fe and Co are quite different with the optimum value of Fe percentage about 13 at. % for this and the low end of the reference 23 at. % Fe which is greater than the highest permissible value of Fe of 21 at. % in this disclosure. The alloys are essentially nearest neighbors in that the only change is that the Fe-Co ratio has been reduced. However, in FIG.

3A, reference 1.3, the composition was Fe 19 atomic percent, Co 67 atomic percent, and Cr 14 atomic percent which provided $H_c$ of 110 Oe; $M_s$ 1050 emu/g; $M_r$ 670 emu/g and S0.63 and corrosion of 40.

U.S. Pat. No. 3,614,893 of Nesbitt et al for a "Splat Cooled Fe-Co-Cr Alloys and Devices Using Same" used as the core of an inductive thermometer because of paramagnetic properties with Fe 15-55% by weight, Co 45-65% by weight, and Cr or V of 10-20% by weight for sensing a temperature dependent change in magnetization of the mass. No statement relative to magnetostriction is made. It is seen however, that the weight percentage of 65% at the top for Co for Fe 23%, Cr 12%, Co 65% converts to Fe 23.6 at. %, Cr 13.2 at. % and Co 62.3 at. % which fails to overlap the bottom of 64 at. % for Co for the present invention. In their Example III, the alloy was 12 weight % Cr, 52 weight %, Co and 36 weight % Fe which converts to Cr 13.1 at. %, Co 50.3 at. %, and Fe 36.7 at. %.

An article by Klokholm and Tan entitled "Sputtering FeCoCr Thin Film Magnetic Media", IBM Technical Disclosure Bulletin 21, No. 10 4241 (March 1979) calls for a high Cr content for corrosion resistance and later quantifies the Cr content as up to 10 at. %. Copending U.S. application Ser. No. 221,867 of Aboaf et al, describes a "Zero Magnetostriction FE-CO-CR Magnetic Alloy". The alloy is $(Fe_yCo_{1-y})_{1-x}Cr_x$ where y (Fe) is preferably 15-23 atomic percent of the Fe-Co part of the alloy. The value of x (Cr) is 7-20 atomic percent of the alloy and the remainder 1−x (Fe-Co) is 83-92 atomic percent of the alloy. The maximum ranges of the composition of the alloy are about as follows:

Fe-8-24 atomic percent
Co-56-83 atomic percent
Cr-7-20 atomic percent

Much work has been done in the ranges of high concentrations of Fe, above 50 at. % and low concentrations of Cr about 1 at. % or less.

None of the prior art suggests the use of the particular range of Co-Pt alloys of this invention for a low magnetostriction alloy for use as a magnetic recording medium.

While the prior art Griest patent suggests the broad range of Co-Pt materials deposited by sputtering, he does not suggest a high coercivity, polycrystalline film or a low or zero magnetostriction film, and his range of at. % of Pt in the alloy is too broad to produce the desired results reliably. Furthermore, he does not teach a polycrystalline thin film with a combination of the fcc phase and the hexagonal phase which yields the high coercivity we have discovered. Such high coercivity is essential to the applications we envision in magnetic recording disks and hard biasing of thin film magnetic magnetoresistive recording heads.

The chief interest in bulk alloys in the $Co_{1-y}Pt_y$ system has centered heretofore on alloys in the region of equiatomic composition. Such alloys when cooled from above 1000° C. have a disordered face centered cubic crystal structure; upon annealing at 600° C. the structure becomes face centered tetragonal. The very high coercivity (thousands of oersteds) obtained for these alloys is the result of the cooling rate from the disordering treatment, the aging, and to some extent it results from the variation in the platinum content around the stoichiometric value. In the region of equiatomic composition, we have been able to increase the coercivity of films from 40 oersteds (as deposited films) to 1000 oersteds after an annealing treatment at 600° C.

SUMMARY OF THE INVENTION

We obtained unexpected results in $Co_{1-y}Pt_y$ films containing from 10 to 30 atomic percent platinum, which were sputtered polycrystalline films with a range of zero magnetostriction, high coercivity, and high saturation magnetization within a preferred range of high Co atomic percentage.

The coercivity of 3000 Å thick films in the above range (saturation magnetization from about 10,000 to 2500 gauss FIG. 3) varies between about 400 and 800 oersteds for as-deposited films at room temperature. No annealing is necessary to obtain these high coercivities. Annealing to 600° C. does not change the coercivity of these films.

The magnetostriction of these films varies from $-50 \times 10^{-6}$ (pure cobalt) to a positive value for films containing 25-30 at. % platinum. Thus, zero magnetostrictive films are obtained in this system, see FIG. 1.

These films are useful as media on magnetic recording disks, as well as films providing permanent magnets for biasing in a hard magnetic bias scheme as used for magnetic magnetoresistive recording heads.

An object of this invention is to provide a magnetic recording material with low magnetostriction to provide a highly reliable magnetic recording disk.

Since it is desirable for the stored information to be retained after it has been recorded, it is highly desirable that the coercivity ($H_c$) of the magnetic recording material should be high in order that inadvertent erasure of the data by surrounding fields will be avoided. It is desirable that the coercivity should exceed that of Fe-CoCr media having a value of $H_c$ of about 500 oersteds, only for very thin films on the order of 500 Å. It is desirable to obtain high $H_c$ for thicker films than 500 Å.

Another object of this invention is that there should be a magnetic recording medium material with a value of magnetization ($4\pi M_s$) which produces a better signal when a magnetic recording head reads the data recorded in the medium, since a greater value of magnetization will generate a larger signal, as desired.

In accordance with this invention a thin film magnetic material is adapted for magnetic magnetoresistive recording heads, for media for recording magnetic transitions representative of data and other magnetic applications. The layer comprises a sputtered polycrystalline film of Co and Pt, having a magnetostriction value of from about $-35 \times 10^{-6}$ to a smaller positive value near substantially zero magnetostriction to about $+10^{-6}$ in accordance with the formula $Co_xPt_y$ where x(Co) is up to about 90 at. % of the material, and the value (y) of Pt is within the range from about 10 to about 30 at. % of the material. Thus the alteration of the magnetic state by extraneous mechanical (magnetostrictive) forces is averted.

Preferably, the material has a coercivity $H_c$ of from about 500 oersteds to about 2000 oersteds with a saturation magnetization of about 4000 gauss to about 15000 gauss.

It is also preferred that the alloy should comprise $Co_xPt_y$ where x is up to about 80 at. % of Co and y is between about 20 and 30 at. % of Pt, with substantially zero magnetostriction $\pm 10 \times 10^{-6}$, a coercivity $H_c$ greater than about 500 oersteds and a saturation magnetization greater than about 5000 gauss, and zero magnetostriction.

In another aspect of the invention a $Co_xPt_y$ alloy is deposited upon a substrate by sputtering. The film produced has a coercivity of at least 500 oersteds, as deposited with a saturation magnetization of 4000 to 15000 gauss for y (Pt) equal to 10 to 30 atomic percent of the alloy. The film has a magnetostriction which varies between $-50 \times 10^{-6}$ to a positive value, passing through zero, of magnetostriction for between 20 and 30 atomic percent platinum in the alloy, or a minimum of saturation magnetization between about 30 and 35 atomic percent of platinum with a flat maximum value for about 45 atomic percent of platinum in the alloy.

Preferably, the film of this invention as described above in this "Summary of the Invention" is magnetically stable for annealing up to at least 650° C.

Preferably, each of the materials described above is a magnetic recording medium or a magnetically hard biasing layer in a magnetic magnetoresistive thin film recording head.

DESCRIPTION OF THE PREFERRED EMBODIMENT

Figure 1:
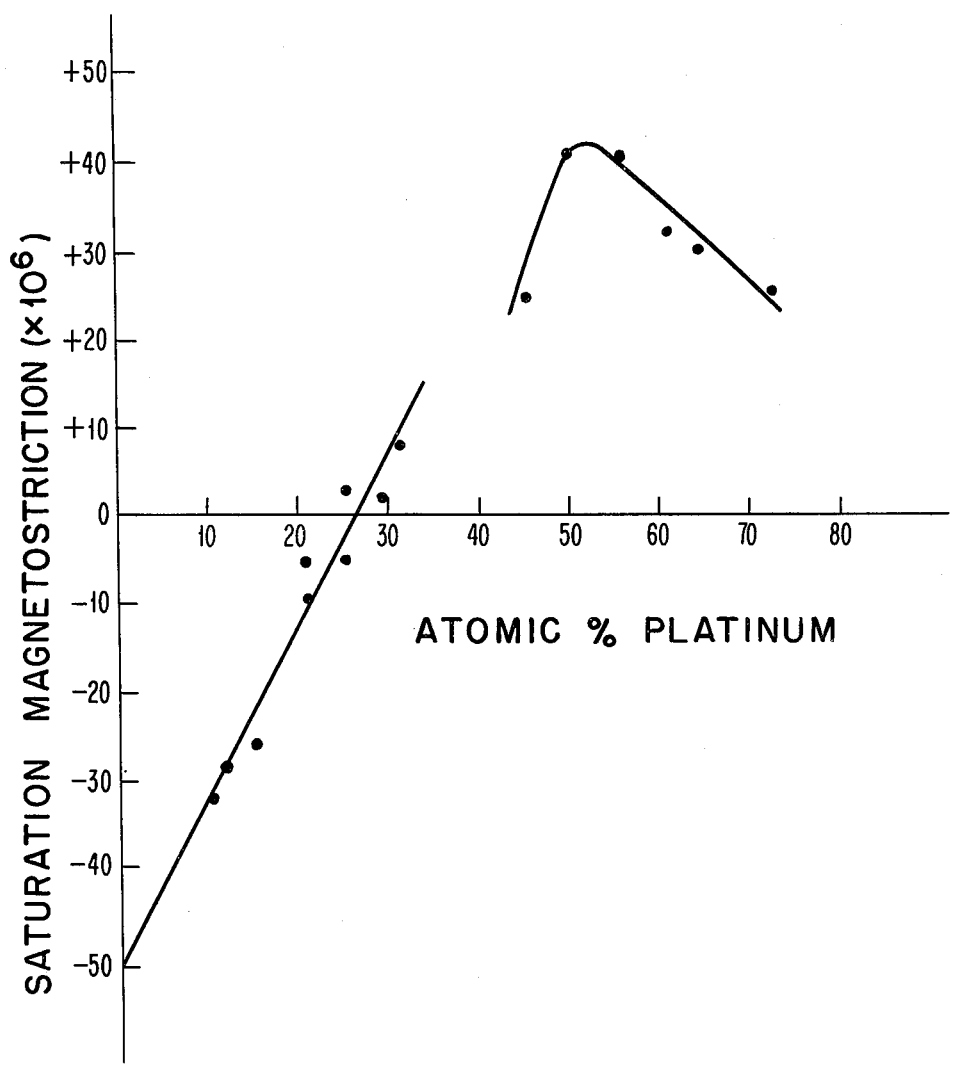
FIG. 1 is a discontinuous curve of saturation magnetostriction $\lambda$ ($\times 10^{+6}$) versus the atomic percent of platinum in the $Co_{1-y}Pt_y$ alloy films with a thickness on the order of 3000 Angstroms.

FIG. 1 shows a curve of saturation magnetostriction multiplied by $10^6$ versus the percentage of platinum in the $Co_{1-y}Pt_y$ thin film of 3000 Å thickness which had been deposited by sputtering as described below. It can be seen that between 20 and 35 atomic percent of Pt in the film that the magnetostriction passes through zero. The value of magnetostriction ranges between about $-10$ and $+10$ which range from superior to very appropriate values for use in magnetic recording disks for minimizing effect of mechanical stress upon the medium when accompanied by magnetostriction.

TABLE II

| At. % of Pt | Magnetostriction $\lambda$ |
|---|---|
| 0 | −51 |
| 10.5 | −32 |
| 12 | −29 |
| 15.5 | −26 |
| 20.5 | − 5 |
| 20.7 | − 9.7 |
| 25.5 | − 5.4 |
| 30.5 | + 8.1 |
| 29.3 | + 1.75 |

TABLE II-continued

| At. % of Pt | Magnetostriction $\lambda$ |
|---|---|
| 45.5 | +25 |
| 50.5 | 41 |
| 55.5 | 41 |
| 60.5 | +32 |
| 73.4 | +25 |

Figure 2:
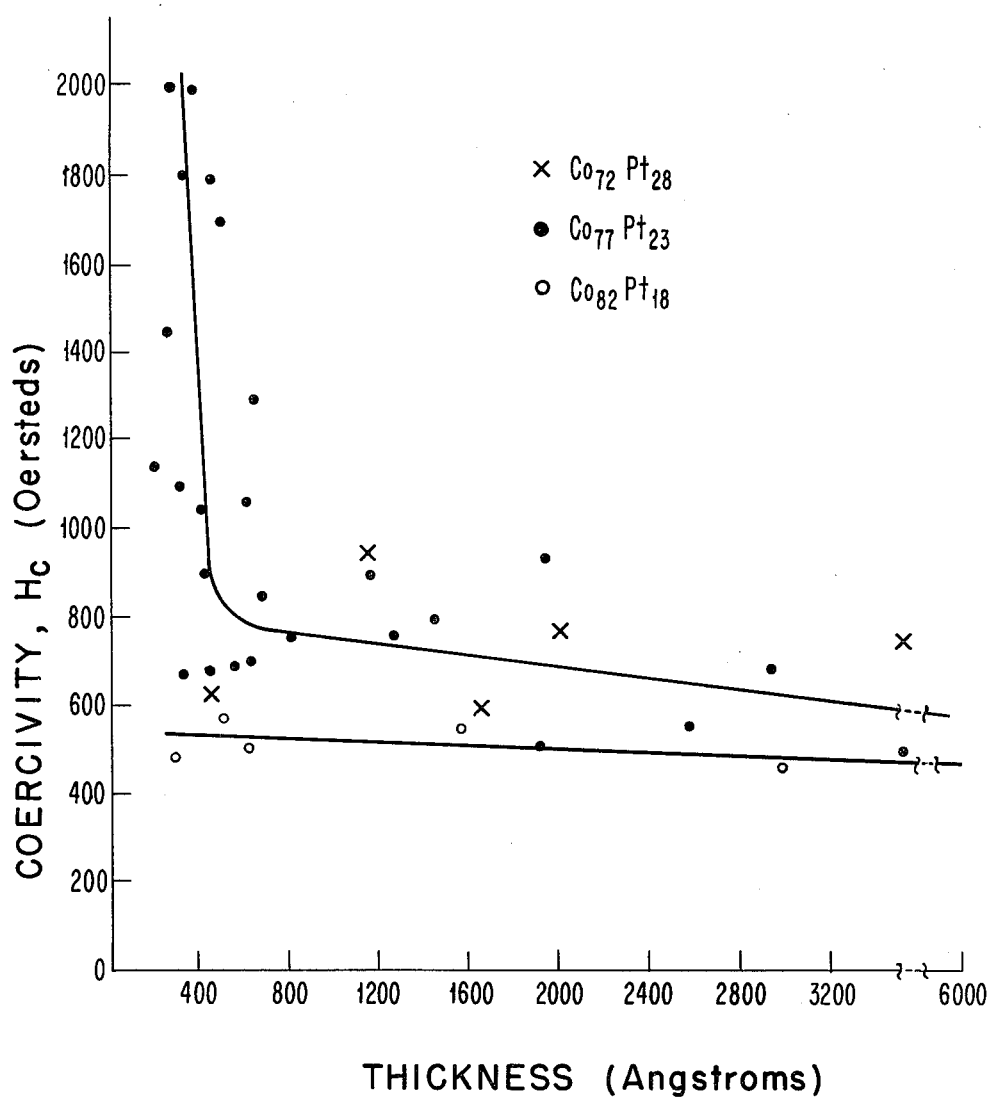
FIG. 2 is a set of curves for coercivity $H_c$ of $Co_{1-y}Pt_y$ films as a function of film thickness with data for $Co_{72}Pt_{28}$, $Co_{77}Pt_{23}$, $Co_{82}Pt_{18}$.
Figure 3:
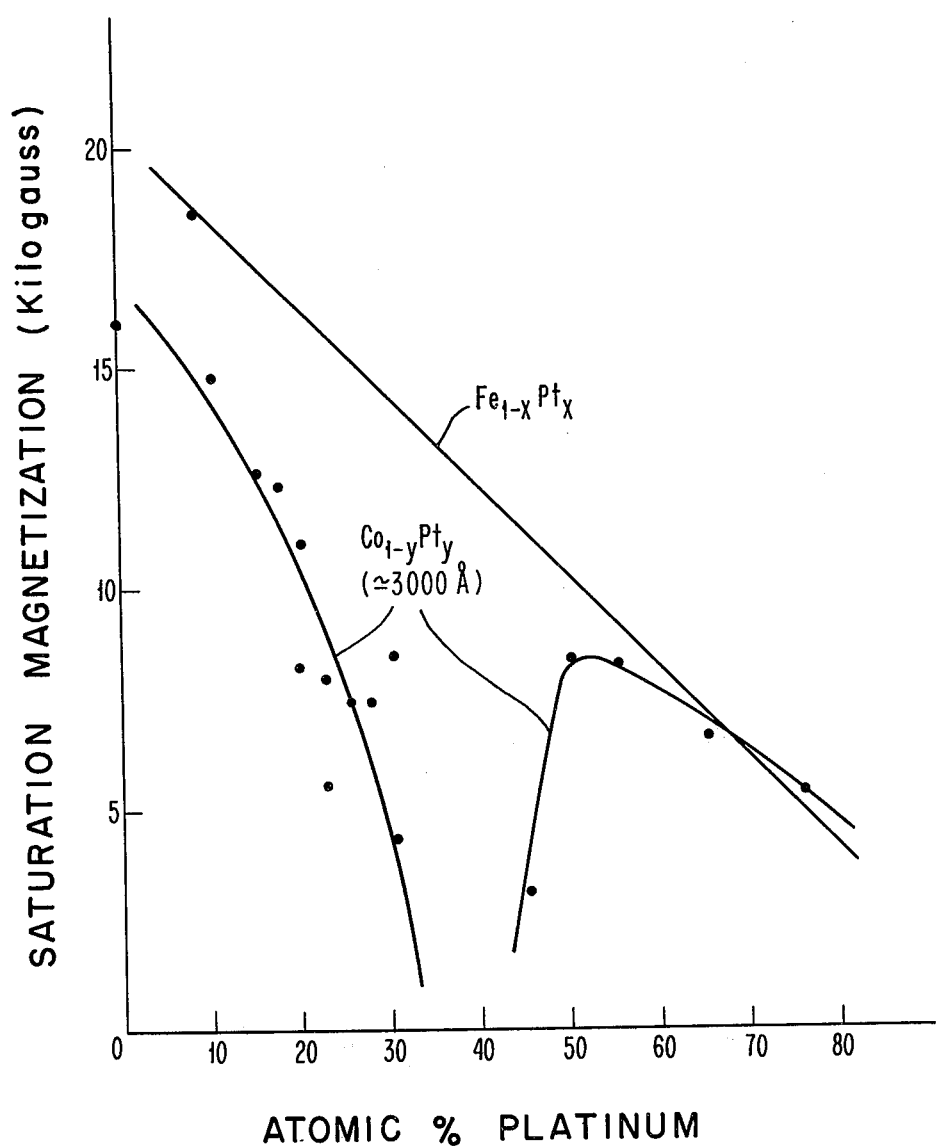
FIG. 3 shows the saturation magnetization in kilogauss of $Fe_{1-x}Pt_x$ and $Co_{1-y}Pt_y$ films as a function of platinum content (atomic percent) in the film for a thickness of about 3000 Å of the thin film. A discontinuity exists in the $Co_{1-y}Pt_y$ curve about 40 atomic percent of Pt in the alloy.

FIG. 2 shows the coercivity of three films of $Co_{1-y}Pt_y$ as a function of thickness of the film in Angstroms. It can be seen that the coercivity is above 400 Oe for all three compositions from 18-28 atomic percent Pt or from 82-72 at. % Co in the films. Data shows that the 23 at. % film reaches extremely high values of coercivity of about 2000 oersteds at about 300 Å thickness down to about 700 Oe at about 500 Å thickness of the film. In addition, in general the values of coercivity $H_c$ are higher for the 23 and 28 at. % Pt films than for the 18 at. % Pt films. In a study of the magnetic properties of sputtered films of $Fe_{1-x}Pt_x$ and $Co_{1-y}Pt_y$ as a function of platinum concentration, we have discovered that whereas thin films of $Fe_{1-x}Pt_x$ about 3000 Å thick behave similarly to bulk alloys, unexpectedly the properties of $Co_{1-y}Pt_y$ do not behave in a similar way for thin films as contrasted to bulk material (thicker layers of $Co_{1-y}Pt_y$ alloys of the same composition). In particular, as shown in FIG. 3, the saturation magnetization of $Co_{1-y}Pt_y$ films decreases rapidly from 16,000 gauss at zero at. % Pt to zero at about 34 at. % Pt. With higher platinum contents, the magnetization increases and then behaves similarly to the results obtained with $Fe_{1-x}Pt_x$ films.

Figure 4:
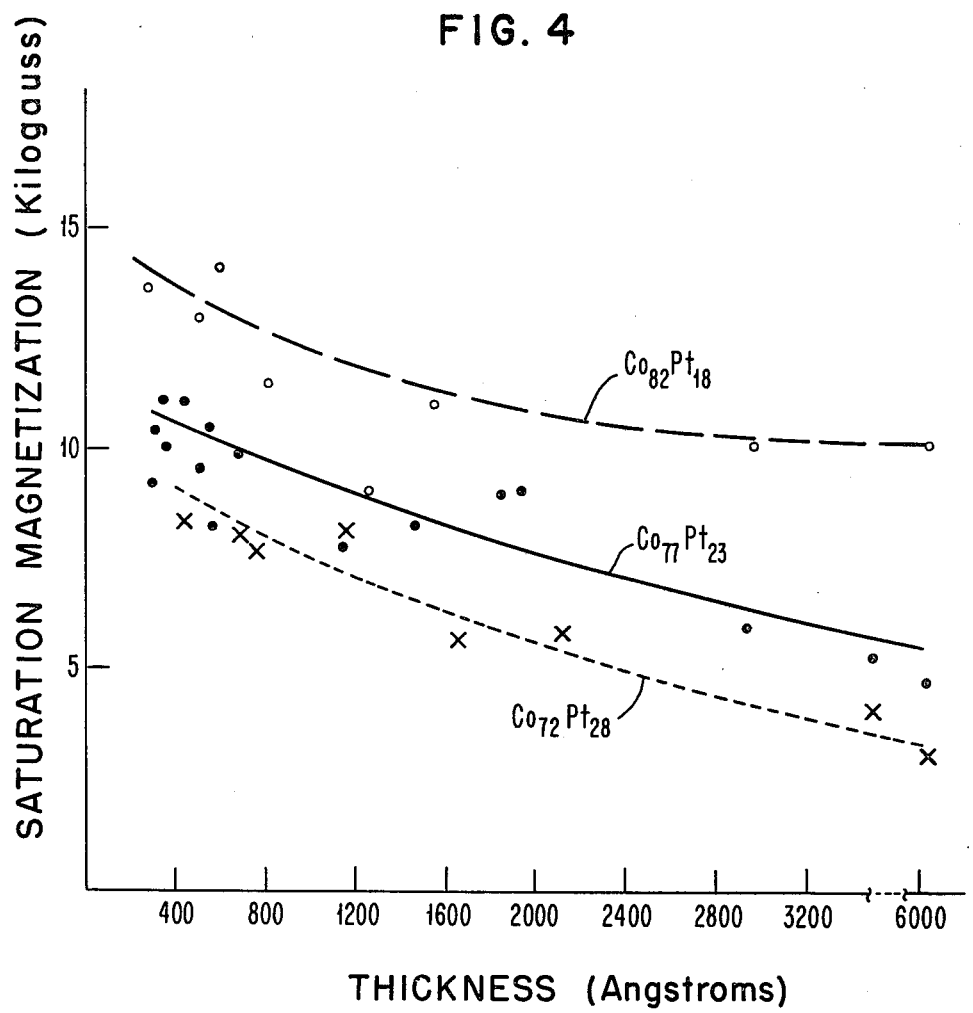
FIG. 4 shows a curve of saturation magnetization in kilogauss versus thickness of the film of $Co_{1-y}Pt_y$ alloys for three different alloys as in FIG. 2 above.

FIG. 4 shows a comparison of the saturation magnetization values for a range of thicknesses of three different compositions of $Co_{1-y}Pt_y$ with values of 18, 23, and 28 at. % of Co. It can be seen that the magnetization decreases from about 15 kilogauss for 18 at. % Pt, 12 kilogauss for 23 at. % Pt, and 10 kilogauss for 28 at. % Pt down to values of about 12, 7.5, and 5 kilogauss for 18, 23 and 28 at. % Co, respectively.

Figure 5:
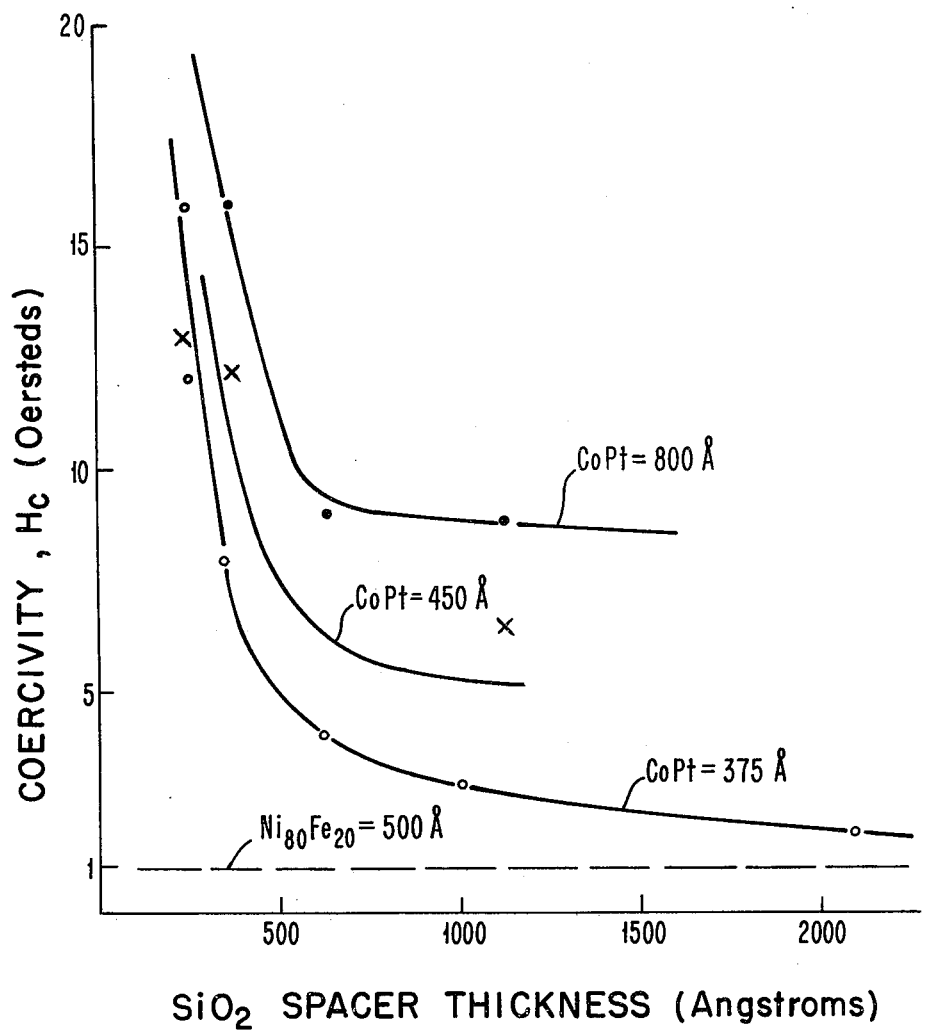
FIG. 5 shows the value of coercivity $H_c$ as a function of spacer thickness in a multilayer film of permalloy 80:20 Ni:Fe, an $SiO_2$ spacer layer, and $Co_{1-y}Pt_y$ alloys as designated on the curves. An indication of the lower coercivity of permalloy 500 Å thick deposited as a single layer alone or without a bias layer is shown in juxtaposition with the $Co_{1-y}Pt_y$ curves.

FIG. 5 shows a curve of coercivity $H_c$ as a function of spacer thickness for the use of the $Co_{1-y}Pt_y$ alloy where Pt is about 25 at. % with an $SiO_2$ spacer laminated with permalloy 80:20/Ni:Fe. The curve is drawn as a function of the thickness of the $SiO_2$ spacer. It can be seen that for the various thicknesses of the $Co_{1-y}Pt_y$ films from 375 Å to 800 Å that the coercivity decreases as the thickness of the spacer is increased. The value of $H_c$ decreases from about 16 Oe for the highest values measured in the 500 Å thickness range for the spacer down to less than 10 Oe for the 800 Å thick $Co_{1-y}Pt_y$ film and below 3 Oe for the 375 Å film of $Co_{1-y}Pt_y$ at thicknesses of the spacer on the order of 2000 Å.

STRUCTURE OF CO-PT FILMS

Electron diffraction structural investigations of the Co-Pt system showed the existence of a hexagonal phase with lattice parameters of $a_o = 2.58$ Å, $c = 4.11$ Å for $Co_{75}Pt_{25}$ as deposited and after annealing for 2 hours at 500° C. The hexagonal phase has a strong [101] texture and the grains are very finely striated. The striations indicate the presence of a faulted structure of a face centered cubic (fcc) structure with a lattice parameter of $a_o = 3.61$ Å which is believed to be the source of the extremely high coercivity ($H_c \sim 1700$ oersteds). After two hours of annealing at 600° C., the above phase transformed to a fcc structure with $a_o=3.68$ Å. Annealing at 700° C. of the sample reduces $H_c$ to 400 oersteds.

Studies of $Co_{45}Pt_{55}$ showed that for films, as deposited, an fcc structure with a lattice parameter of $a_o=3.78$ is obtained. Upon annealing at 500° C. the structure exhibited additional electron diffraction lines fitting the disordered fcc structure with a lattice parameter of $a_o=3.79$ Å reported in the literature. Grain growth from $5-10\times10^{-9}$ meters as deposited to $50-80\times10^{-9}$ meters after the 500° C. annealing was accompanied by faulting and striations within the grains. This trend was continued after the 600° C. annealing with the appearance of line splitting indicated by the formation of the ordered tetragonal phase separated from the fcc phase. This phase is the source of high coercivity from 150 oersteds to 1000 oersteds after the 600° C. anneal.

$Co_{25}Pt_{75}$, which was an ordered fcc structure, with a lattice parameter of $a_o=3.815$ Å, as deposited, responded to heating at 500° C. by grain growth from $5-10\times10^{-9}$ meters together with development of a strong [111] texture and the appearance of additional lines indicating face centered cubic disordering of the fcc structure with a lattice parameter of $a_o=3.85$ Å.

The disordering increases after two hours at 600° C. with the somewhat broadened [100], [211] and [321] electron diffraction lines of an fcc structure with a lattice parameter of $a_o=3.865$ Å. No change in coercivity was measured for this sample and no striations are observable within the grains. This confirms that the high coercivity in the $Co_{45}Pt_{55}$ sample is due to the formation of the ordered tetragonal phase within the cubic disordered phase and not due to cubic disordering. Similarly, precipitation of the fcc phase in the hexagonal $Co_{75}Pt_{25}$ alloy is the cause of high coercivity.

TABLE I

Effect of Annealing at Various Temperatures on Coercivity $H_c$

| $H_c$ | As deposited | 2 hrs 500° C. | 2 hrs 600° C. | 1 hr 700° C. | 1 hr 800° C. |
|---|---|---|---|---|---|
| $Co_{77}Pt_{23}$ | | | | | |
| 1150 Å | 950 Oe | 1000 Oe | 750 | 230 | 200 |
| 500 Å | 1700 | 1700 | 1700 | 400 | 220 |
| $Co_{45}Pt_{55}$ | | | | | |
| 1100 Å | 150 | 1200 | Very high | — | |
| 450 Å | 90 | 1200 | Very high | 450 | |
| $Co_{26}Pt_{74}$ | | | | | |
| 1100 Å | 190 | 190 | 50 | 50 | 650 |
| 450 Å | 160 | 150 | 90 | 80 | — |

FILM SPUTTERING

In particular, the water cooled 15 cm diameter cathode target is made of a copper plate on which a 70 micron thick pure plate of cobalt has been mounted. Triangular shaped segments made of Pt 0.5 mm thick are positioned on the cobalt plate, with their base held by springs on the outer circumference of the plate and their apex under a cobalt screw mounted in the center of the plate. The anode is water cooled and can be rotated. The anode can also be heated. Metal alloy films were sputtered on 2.5 cm diameter thermally oxidized silicon wafers. The chamber is typically evacuated to $(1\times10^{-6})$ torr. High purity argon is introduced in the system and the pressure controlled at 20 millitorr. With a shutter covering the substrate holder, the segmented target is pre-sputtered for an hour to clean its surface and help getter the system of background impurities. The substrates are then exposed to the incident flux. Both pre-sputtering and sputtering are done for the same predetermined conditions: 1000 volt cathode bias and −50 volt anode bias. The rotating substrate holder (60 r.p.m.) assures the circumferential composition uniformity of the deposited film.

The thickness of the films was measured in the center of the wafer using a mechanical surface profile meter. The accuracy is limited by the thickness uniformity of the sample which can be in one case as large as 20% from one edge of the sample to the other. The chemical composition of alloy films, typically 3000 Å thick, was measured by electron microprobe. The magnetic properties were measured using an inductive loop tracer which displayed the B vs. H curve directly on an oscilloscope. The saturation magnetization at room temperature was measured at high fields from the B-H loop. The instrument was calibrated by measuring the saturation magnetization of several samples using a force balance magnetometer. The coercivity $H_c$ was obtained from the easy axis hysteresis loop. The saturation anisotropy field $H_k$ was obtained by extrapolating the hard axis loop at small drive fields to the saturation magnetization value. The resistivity measurements were made at room temperature using a four-point probe. Magnetostriction measurements were made at room temperature using the apparatus developed by E. Klokholm, IEEE Trans. MAG-12 6 (1976).

RESULTS AND DISCUSSION

Sputtering of Alloys:

The results reported here are for sputter depositions made in 20 microns argon pressure at a −50 volt anode bias and 1000 volts cathode potential. The variation of the composition of the films was obtained by varying the area coverage of the Co target plate by Pt and analysis of the films was made by electron microprobe analysis. Once the system is calibrated, various compositions can be obtained reproducibly. The uniformity of the chemical composition of the deposited films is constant within the precision of the electron microprobe analysis (accuracy $\pm2\%$ for cobalt and platinum). The deposition rate of the films is about 50 angstroms per minute.

INDUSTRIAL APPLICABILITY

Co-Pt thin film alloys with 20 to 30 at. % Pt have been shown to possess coercivities in the 400 to 800 Oe range, $4\pi M \approx 5000$ to 10000 g, and nearly zero magnetostriction, in conjunction with simple deposition techniques (sputtering) without need for annealing, a very attractive combination of properties for magnetic storage applications on disks.

These materials are also useful as hard magnetic biasing materials for thin film magnetic recording heads.

Having thus described our invention, what we claim as new and desire to secure by Letters Patent is:

1. A thin film magnetic recording medium for recording magnetic transitions representative of data said thin film magnetic recording medium consisting of a sputtered polycrystalline film of Co and Pt, having a magnetostriction value of from about $-35\times10^{-6}$ to a smaller positive value near substantially zero magnetostriction to about $\pm10\times10^{-6}$ in accordance with the formula $Co_xPt_y$ where x (Co) is up to about 90 at. % of said material and the value y (Pt) is within the range of about 10 to about 30 at. % of said material whereby alteration of the magnetic state of said material in response to extraneous mechanical forces is averted.

2. A material in accordance with claim 1 wherein said medium has a coercivity $H_c$ of from about 500 to about 2000 oersteds with a saturation magnetization of about 4000 gauss to about 15,000 gauss.

3. A material in accordance with claim 1 wherein said medium comprises $Co_xPt_y$ where x is up to about 80 at. % of Co and y is between about 20 and 30 at. % of Pt, magnetostriction between about $\pm 10\times 10^{-6}$, coercivity $H_c$ greater than about 500 oersteds and a saturation magnetization greater than about 5000 gauss.

4. A sputtered polycrystalline alloy consisting of $Co_xPt_y$ having a minimum of saturation magnetization between about 30 and 35 at % of platinum with a maximum value between about 45 and 50 at % platinum in the alloy.

5. A material in accordance with claims 1, 2, 3, or 4 wherein said material is a magnetic recording medium.

6. A material in accordance with claims 1, 2, 3, or 4 wherein said material is a magnetically hard biasing layer in a thin film magnetoresistive magnetic recording head.

7. A material in accordance with claims 1, 2, 3, or 4 wherein said cobalt platinum comprises a polycrystalline structure with the face centered cubic and hexagonal structures present.

8. In a thin film magnetic recording head, said thin film magnetic recording head including a sputtered polycrystalline thin film of Co and Pt, having a magnetostriction value of from about $-35\times 10^{-6}$ to a smaller positive value near substantially zero magnetostriction to about $\pm 10\times 10^{-6}$ in accordance with the formula $Co_xPt_y$ where x (Co) is up to about 90 at. % of said thin film and the value y (Pt) is within the range of about 10 to about 30 at. % of said thin film whereby alteration of the magnetic state of said thin film in response to extraneous mechanical forces is averted.

9. A head in accordance with claim 8 wherein said head has a coercivity $H_c$ of from about 500 to about 2000 oersteds with a saturation magnetization of about 4000 gauss to about 15,000 gauss.

10. A material in accordance with claim 8 wherein said thin film comprises $Co_xPt_y$ where x is up to about 80 at. % of Co and y is between about 20 and 30 at. % of Pt, magnetostriction between about $\pm 10\times 10^{-6}$, coercivity $H_c$ greater than about 500 oersteds and a saturation magnetization greater than about 5000 gauss.

11. In a film consisting of $Co_xPt_y$, comprising a sputtered polycrystalline alloy of $Co_xPt_y$ wherein the magnetostriction varies between $(-50\times 10^{-6})$ to a positive value, passing through zero magnetostriction for y (Pt) equal to between 20 and 30 at. % platinum of said alloy.

12. In an alloy consisting of $Co_xPt_y$, the improvement comprising a sputtered polycrystalline alloy consisting of $Co_xPt_y$ having,
    (a) A coercivity of at least 500 Oe as deposited with a saturation magnetization of 4000 to 15,000 gauss for y (Pt) equal to 10 to 30 at. % of said alloy.

* * * * *